UNITED STATES PATENT OFFICE.

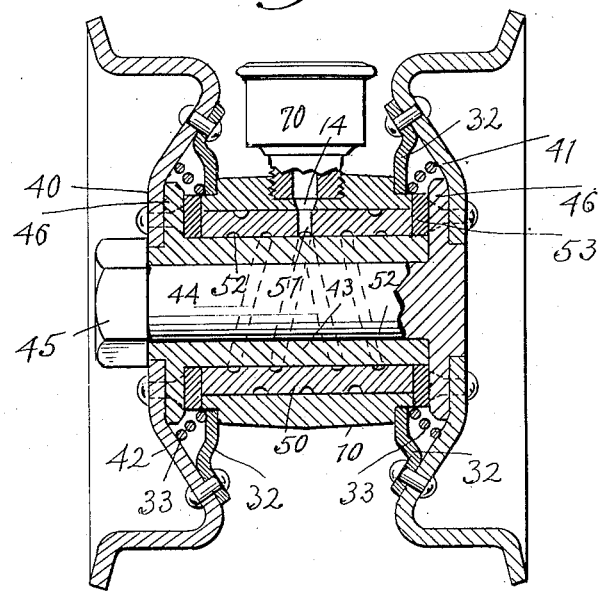
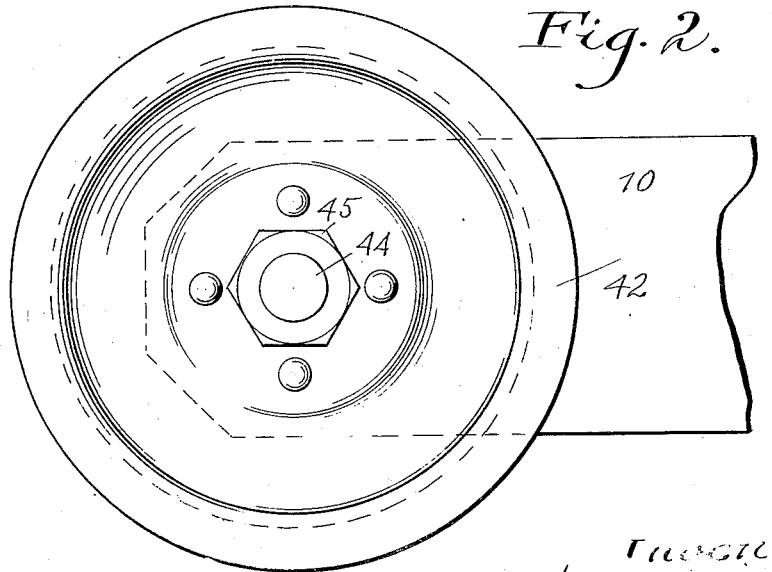

ANTON F. GREINER, OF CLEVELAND, OHIO, ASSIGNOR TO THE CLEVELAND TRACTOR COMPANY, OF EUCLID, OHIO, A CORPORATION OF OHIO.

WHEEL AND BEARING THEREFOR.

1,382,355.  Specification of Letters Patent.  Patented June 21, 1921.

Application filed July 8, 1920. Serial No. 394,712.

*To all whom it may concern:*

Be it known that I, ANTON F. GREINER, a citizen of Germany, residing at Cleveland, in the county of Cuyahoga and State of Ohio, have invented a certain new and useful Improvement in Wheels and Bearings Therefor, of which the following is a full, clear, and exact description.

The object of the invention is to so construct and mount wheels that they will be cheap and durable, and particularly adapted for uses where it is difficult to maintain proper lubrication and to exclude dust from the bearings. In the construction shown the invention is particularly adapted for use in track laying tractors, in which the wheels will run on track belts. In the varying conditions which arise in the use of tractors, these track belts and the wheels themselves are sometimes submerged in mud, sometimes they run in soft sand; and therefore the problem of excluding dust from the track wheel bearings and of providing adequate lubrication therefor has been a difficult one. The present invention has been found to be a very satisfactory solution of these problems.

The invention consists in the construction and combination of parts shown in the drawings and hereinafter described and pointed out definitely in the appended claims.

In the drawing, Figure 1 is a diametrical vertical section of the invention, and Fig. 2 is a side elevation thereof.

Each wheel is made of two sections 40 and 41, each having a body portion 42 and a long hub. One of these hubs 43 is tubular, and the other hub 44 telescopes through and is nicely fitted in it. Suitable means are provided to hold the hubs against relative endwise movement when the wheel sections are in the desired spaced relation. In the preferred construction the inner hub 44 projects entirely through and beyond the outer hub 43 and has a threaded end on which a nut 45 is screwed, thereby drawing the two wheel sections toward one another until the end of the outer hub engages a part rigid with the other wheel sections, as for example, the shoulder 44ª.

The outer hub is rotatably mounted in a sleeve 50, and this sleeve in turn is mounted in a tubular bearing formed in a supporting member 10. The sleeve 50 may be fitted tightly in said bearing, or it may be rotatably fitted therein as desired, the latter being the preferred construction.

Washers 53 which serve the double purpose of dust washers and thrust bearings are fitted around the outer hub 43 near each end thereof and each engages on the inner face with an end of the supporting member and an end of the sleeve 50, and on its outer face against a finished surface on the inner face of the adjacent wheel section so as to make nice sliding joints between the washers and the parts specified with which they engage.

The grease or oil cup 70 is mounted on the support 10, in communication with an oil duct 14 formed through it leading to the bearing in which the sleeve 50 is mounted. This sleeve 50 has through it at least one radial oil duct 51 which is so placed that it may register with the oil duct 14 and thus permit oil or grease to pass through to the bearing surface between the sleeve and the hub 43.

In the inner surface of the sleeve 50 are spiral oil grooves 52, which wind in opposite directions from the oil duct 51 toward opposite ends of the sleeve. The lubricant which passes through the duct 52 will flow into these spiral grooves, and thence toward the ends of the sleeve. These grooves will, in fact, force the oil in the stated directions. If the sleeve 50 is mounted to rotate in the support, similar spiral oil grooves may be formed in the outer surface of the sleeve. The described grooves will act to force the lubricant toward the end of the sleeve so that there will always be a pressure tending to force the lubricant out of the ends of the sleeve and past the two washers 53 at the ends of the sleeve. The relatively movable surfaces will be always properly lubricated, and the entry of dust to the bearing surfaces will be opposed by the pressure tending to force the lubricant through the channels through which dust must enter in order to reach the bearing surfaces.

In the specific construction shown each wheel section has a pressed metal body portion, and the associated hub provided with a flange 46 to which the pressed metal wheel body portion is secured by rivets or the like. This specific construction is not, however, essential to the invention as defined by some of the appended claims.

The described construction is admirably adapted for combination with felt or dust excluding disks 32, 32, each of which at its outer edge is riveted to a wheel body and at its inner edge is in rubbing contact with the adjacent end of the supporting bearing,—such contact being maintained by a coil spring 33.

Having described my invention, I claim:—

1. The combination of a sleeve having a tubular cylindrical bearing and a wheel which is made of two separably connected sections and is provided with a hub which extends between said sections and is rotatably mounted in said bearing.

2. The combination of a support having a tubular cylindrical bearing, and a wheel which is made of two separably connected sections and is provided with a hub which extends between said sections and is rotatably mounted in said bearing, said support being provided with an oil duct leading to the bearing, and a lubricant cup connected with said oil duct.

3. The combination of a support having a tubular cylindrical bearing, and a wheel which is made of two separably connected sections and is provided with a hub which extends between said sections and is rotatably mounted in said bearing, said support having an oil duct leading to the bearing, and said bearing having spiral grooves in its inner surface winding in opposite directions from said oil duct therein toward the ends of said bearing.

4. The combination of a support having a tubular cylindrical bearing, and a wheel which is made of two separably connected sections and is provided with a hub which extends between said sections and is rotatably mounted in said bearing, said support having an oil duct leading to the bearing, and the bearing having spiral grooves winding in opposite directions from said oil duct to the ends of the bearing, and dust washers fitted between the inner faces of the wheel sections and the ends of the tubular bearing.

5. The combination of two wheel sections each provided with a hub, one of said hubs being tubular and the other hub being telescoped through and fitted to the tubular hub, and means engaging said inner hub to hold it against endwise movement in the outer hub and to preserve the spaced relation between the wheel sections.

6. The combination of two wheel sections each comprising a pressed metal body portion, and a hub having a flange to which the body portion is secured, one of said hubs being tubular and the other hub being telescoped through and fitted to the tubular hub, and means to prevent relative endwise movement of said two hubs and to thereby preserve the spaced relation of the wheel sections.

7. The combination of a support having a tubular cylindrical bearing, a sleeve which is rotatably mounted in said bearing, and a wheel which is made of two separably connected sections and is provided with a hub which extends between said sections and is rotatably mounted in said sleeve.

In testimony whereof I hereunto affix my signature.

ANTON F. GREINER.